United States Patent Office 3,492,275
Patented Jan. 27, 1970

3,492,275
IONOGENIC POLYMERIZATION OF LACTAMS
Johan A. Bigot, Beek, Limburg, Johannes van Mourik, Geleen, and Johannes van Beveren, Sittard, Netherlands, assignors to Stamicarbon N.V., Heerlen, Netherlands
No Drawing. Filed July 24, 1967, Ser. No. 655,302
Claims priority, application Netherlands, Aug. 4, 1966, 6610960
Int. Cl. C08g 20/10, 20/12, 20/18
U.S. Cl. 260—78                    6 Claims

ABSTRACT OF THE DISCLOSURE

The use of carbonic esters of benzil-dioxime as promoters, used in conjunction with catalysts, in the ionogenic catalytic polymerization of lactams, is disclosed. The use of such promoters allows rapid polymerization with high yields of amide polymers, which are useful in the production of molded products.

BACKGROUND OF THE INVENTION

In the ionic polymerization of lactams, the prior art has accelerated the polymerization, which is usually carried out with an alkali metal compound as the catalyst, by additionally using a promoter. The promoters used by the prior art included nitrogenous compounds, such as isocyanates, carbodiimides, cyanamides, etc. In general, these prior art promoters are compounds with a tertiary nitrogen atom bound to a carbonyl, thiocarbonyl, sulfonyl or nitroso group. The use of promoters allows the lactam polymerization to be carried out in a relatively short period of time and at temperatures lower than the melting point of the resultant polymers, so that lactams whose molecules contain at least 6 carbon atoms in the ring can be polymerized to form a solid product which adopts the shape of the reaction space, or reaction zone, in which the polymerization has been conducted.

SUMMARY OF THE INVENTION

The present invention is directed to the ionogenic catalytic polymerization of lactams or mixtures of lactams in the presence of a catalyst and a promoter, wherein the promoter is a carbonic ester of benzil-dioxime, i.e. the dioxime of the diketone called benzil. The promoters accelerate the polymerization reaction, and allow the production of useful molded products.

GENERAL DESCRIPTION OF THE INVENTION

Lactams, such as ω-lactams, are polymerized in high yields and in short reaction times by ionogenic, catalytic polymerization in the presence of a promoter, wherein the promoter is a carbonic ester of benzil-dioxime. Preferred carbonic esters of benzil-dioximes are of the general formula:

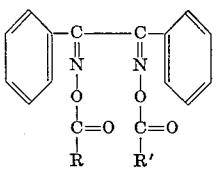

wherein R and R' each contain from 1 to 18 carbon atoms and are independently selected from the group consisting of alkyl and aryl. Among suitable alkyl groups may be mentioned, methyl, ethyl, propyl, hexyl and dodecyl. As examples of suitable aryl groups, there may be mentioned phenyl and naphthyl. Preferably, both R and R' are methyl, ethyl or phenyl (that is, the carbonic esters are the diacetate, the dipropionate or the dibenzoate esters). Examples of suitable promoters which may be used are, by way of example and not of limitation, benzil-dioxime-diacetate, benzil-dioxime-dipropionate and benzil-dioxime-dibenzoate. Mixtures of promoters may be used.

The lactam may be mixed with the catalyst and the promoter in any conventional way. Preferably, the lactam is melted, the catalyst is distributed in the melt, and the mixtures is then heated to the polymerization temperature, and thereafter the promoter is added.

The reaction may be carried out at the conventional temperatures for the ionogenic catalyzed polymerization of lactams, e.g., at temperatures within the range of about 90 to 250° C. Preferably, the initial temperature is within the range of about 90 to 150° C. Because of the exothermic nature of the polymerization reaction, the temperature generally rises during polymerization, but usually remains below about 200 to 215° C. The ionogenic polymerization of lactams using the promoters of the present invention will generally be completed within a very short period of time, often in less than ten minutes. If the reaction temperature is between the melting point of the monomeric lactams and that of the resultant polymer, the polymerization yields solid macromolecular products in the form of molded products whose dimensions correspond to those of the reaction vessel in which the polymerization has been effected.

Suitable catalysts for use in conjunction with the promoter include, for instance, lactam-metal compounds containing a metal atom bound to the nitrogen atom of a lactam, such as, for example, sodium caprolactam. The lactam-metal compound may suitably be derived from the lactam which is to be polymerized. The catalyst may be formed in situ by the use of substances which upon reaction with the lactam yield the desired lactam-metal compounds. Suitable compounds for the in situ formation of the catalyst include metal-triisopropyl aluminum, diethyl zinc, alkali metals, alkaline earth metals, alkalimetal alkyls, and compounds of alkali metals and alkaline earth metals which exhibit an alkaline reaction, such as hydrides, oxides, hydroxides and carbonates, as well as Grignard compounds, such as alkyl magnesium bromide and aryl magnesium bromide. The amount of catalyst used may vary over wide limits. Generally, at least 0.1 mole percent of the catalyst will be used, and preferably about 0.1 to about 3 mole percent, with respect to the amount of monomer to be polymerized, of the catalyst will be used, although larger amounts of the catalyst, such as 5 or 10 mole percent, or even higher, may be used. Generally, no advantages are obtained by using amounts of catalyst in excess of 10 mole percent, and therefore the catalyst will generally be within the range of 0.1 to 10 mole percent, based on the moles of monomer which are to be polymerized.

The amount of promoter may likewise be varied over wide limits. The promoter may generally be used in amounts of about 0.05 to about 10 mole percent, based on the moles of monomer to be polymerized, and preferably the promoter is within the range of 0.05 to 2 mole percent. Even larger amounts of the promoter may be used, but in such cases, the degree of polymerization will be lower than if the preferred amounts of promoter are used. Smaller amounts of the promoter may also be used, but ofttimes the reaction time will be unduly lengthened if less than 0.05 mole of the promoter are used.

The lactams which are polymerized are preferably ω=lactams, such as butyrolactam, caprolactam, oenantholactam, caprylolactam, decyllactam, undecyllactam and laurinolactam. The structure and properties of the resultant polymers may be influenced by polymerizing a mixture of monomers, such as two, three or even more lactams, to form copolyamides. As examples of copolyamides which can be produced by the present invention, there may be mentioned, for instance, oenantholactam-caprolactam-laurinolactam-copolyamide,
laurinolactam-oenantholactam-copolyamide,
undecyllactam-caprolactam-copolyamide,
caprolactam-caprylolactam-laurinolactam-copolyamide,
laurinolactam-caprolactam-copolyamide and
butyrolactam-caprolactam-copolyamide.

A wide variety of conventional additives may be added to the monomeric lactams to produce special polymeric products. For instance, the appearance and properties of the polymers may be changed by the addition of suitable additives. Among such additives, which can be suitably distributed in the lactam melt, may be mentioned various coloring agents and also inert fillers, such as wood meal, carborundum, carbon black, powdered shale, coal dust, and coke dust. Natural and/or synthetic fibers, filaments and/or fabrics made therefrom may be worked into the lactam melt. Various polymers, such as polystyrene, polyformaldehyde, polypropylene, polyethylene, polyamides and poly condensation products of aldehyde with phenol, melamine and/or urea may be incorporated into the lactam melt to modify the properties of the resultant lactam polymer. If cellular products are desired, suitable swelling agents, for example, hydrocarbons which vaporize during the polymerization, may be mixed into the starting materials.

The invention will be understood more readily by reference to the following examples; however, these examples are intended to illustrate the invention and are not to be construed to limit the scope of the invention.

EXAMPLE 1

A glass cylinder of 2.5 cm. diameter was placed in an oil bath maintained at a temperature of 150° C. The molten mixture of ε-caprolactam (20 g.) and potassium caprolactam (0.4 g., 1.5 mole percent) was introduced into the cylinder and a current of nitrogen was passed into the molten mixture by way of an inlet tube. Thereafter, benzil-dioxime-dibenzoate (0.6 mole percent) was added by way of the nitrogen stream, and after 30 seconds, the nitrogen current was stopped and the inlet tube removed. After 4 minutes, the polymerization was complete. The polymerized -caprolactam had assumed the form of the glass cylinder, and the resulting bar exhibited good physical properties, suggesting its application in a wide variety of uses, such as molded housings, gears, and the like.

EXAMPLE 2

The polymerization as described in Example 1 was repeated except that the promoter was benzil-dioxime-diacetate (0.6 mole percent). Polymerization was complete, and the resulting bar removed from the glass cylinder after 7 minutes. The polymer had attractive physical properties.

EXAMPLE 3

The polymerization as described in Example 1 was repeated except the promoter was benzil-dioxime-dipropionate (0.6 mole percent). Polymerization was complete, and the resulting bar was removed from the glass cylinder, after about 6 minutes.

It will be appreciated from the foregoing examples that the use of the promoters of the present invention allows the rapid ionogenic polymerization of lactams, and the polymerization process especially lends itself to the production of molded articles which assume the shape of the polymerization vessel or container.

Obviously many modifications and variations of the present invention are possible in the light of the above teachings. It is, therefore, to be understood that within the scope of the appended claims, the invention may be practiced otherwise than as specifically described.

What is claimed is:
1. In a process for the polymerization of lactams in which at least one lactam is subjected to catalytic polymerization at a temperature of about 90 to about 250° C. in the presence of a catalytic amount of at least one polymerization catalyst and a promoting amount of at least one promoter, the improvement consisting essentially of using, as said promoter, at least one carbonic ester of benzil dioxime of the general formula:

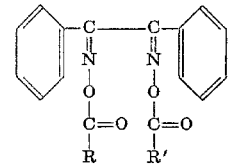

wherein R and R' contain about 1 to 18 carbon atoms and are independently selected from the group consisting of alkyl and aryl.

2. The process as claimed in claim 1, wherein the promoter is selected from the group consisting of benzil-dioxime-diacetate, benzil-dioxime-dipropionate, and benzil-dioxime-dibenzoate, and mixtures thereof.

3. The process as claimed in claim 2, wherein from about 0.1 to about 10 mole percent of the polymerization catalyst, and about 0.05 to about 10 mole percent of the promoter, are used.

4. The process as claimed in claim 3, wherein from about 0.1 to about 3 mole percent of the catalyst, and about 0.05 to 2 mole percent of the promoter, based on the moles of lactams to be polymerized, are used.

5. The process as claimed in claim 2, wherein the reaction temperature is between the melting point of the lactam and the melting point of the resulting polymeric product, and the polymerization is conducted within a reaction vessel, whereby the resultant polymeric products assume the shape of the reaction vessel.

6. The process as claimed in claim 2, wherein the lactam is selected from the group consisting of butyrolactam, caprolactam, oenantholactam, caprylolactam, decyllactam, undecyllactam, laurinolactam, and mixtures thereof.

References Cited

UNITED STATES PATENTS 3,342,784  9/1967  Gehm et al. _____ 260—78

HAROLD D. ANDERSON, Primary Examiner

U.S. Cl. X.R.

260—2.5, 9, 78, 841, 857